Figure 1:
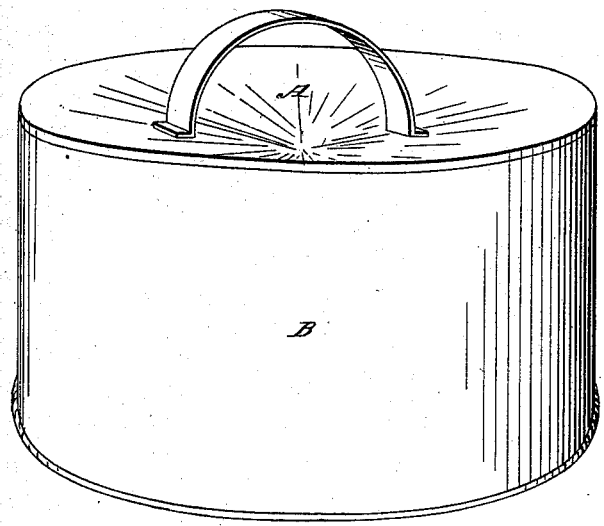
Figure 2:
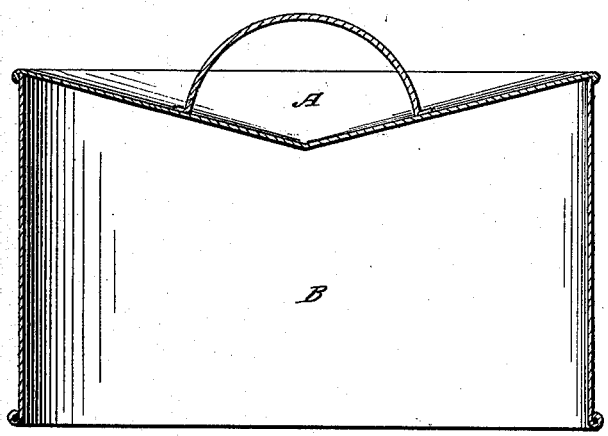

L. B. OVIATT.
Domestic-Boiler Cover.

No. 107,803.

Patented Sept. 27, 1870.

WITNESSES:

INVENTOR:

United States Patent Office.

LUMAN B. OVIATT, OF BROOKLYN VILLAGE, OHIO.

Letters Patent No. 107,803, dated September 27, 1870.

IMPROVEMENT IN COVERS FOR COOKING-UTENSILS.

The Schedule referred to in these Letters Patent and making part of the same.

*To all whom it may concern:*

Be it known that I, LUMAN B. OVIATT, of Brooklyn village, in the county of Cuyahoga and State of Ohio, have invented a new and improved Mode of Preventing the Escape of Steam and Odors from Cooking-Vessels; and I do hereby declare that the following is a full and exact description, to wit:

The nature of my invention consists in so constructing covers of tin or other metal for cooking-vessels as to prevent the escape of steam or smell therefrom, and also to economize the fuel required for cooking.

To enable others skilled in the art to make and use my invention, I will proceed to describe its construction and operation.

I construct my covers as follows:

The size and height are proportioned to the size of vessel used beneath.

The top A, shown in the accompanying drawing, is of tin, in the shape of an inverted cone, with the point in the center, from which the condensed steam falls back into the vessel beneath.

The sides are in shape of a hollow cylinder, B, and firmly fastened to the top A by rolling, soldering, or otherwise, high enough to reach above the top of the vessel beneath, and of sufficient diameter to leave a space between it and the said vessel beneath.

When heat is applied, the cover being in place, the heat is retained and intensified by reflection from the sides of the said cover, the steam is condensed upon the top, and falls back into the vessel beneath, or, descending, comes in contact with the heated surface of the stove, and is in part decomposed or absorbed, and the balance, in consequence of the augmented heat, reascends to be condensed, as before, upon the top of the cover.

What I claim as my invention, and desire to secure by Letters Patent, is—

The application to vessels used for cooking, &c., of covers of tin or other metal, as hereinbefore described, and for the purposes set forth.

LUMAN B. OVIATT.

Witnesses:
C. B. GALENTINE,
O. W. Y. GALENTINE.